(12) United States Patent
Doi et al.

(10) Patent No.: US 11,280,421 B2
(45) Date of Patent: Mar. 22, 2022

(54) FLUORINE RESIN MOLDED BODY

(71) Applicant: SMC CORPORATION, Chiyoda-ku (JP)

(72) Inventors: Yoshitada Doi, Koshigaya (JP); Yuzuru Okita, Tsukubamirai (JP); Keisuke Ikeda, Abiko (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/917,974

(22) Filed: Jul. 1, 2020

(65) Prior Publication Data

US 2021/0003228 A1 Jan. 7, 2021

(30) Foreign Application Priority Data

Jul. 5, 2019 (JP) ............................ JP2019-125692

(51) Int. Cl.
| | | |
|---|---|---|
| *F16K 25/00* | (2006.01) | |
| *F16K 7/14* | (2006.01) | |
| *F16J 15/10* | (2006.01) | |
| *F16J 15/06* | (2006.01) | |

(52) U.S. Cl.
CPC ........... *F16K 25/005* (2013.01); *F16J 15/062* (2013.01); *F16J 15/102* (2013.01); *F16J 15/104* (2013.01); *F16J 15/106* (2013.01); *F16K 7/14* (2013.01)

(58) Field of Classification Search
CPC ...... F16K 25/005; F16J 15/104; F16J 15/016; F16J 15/062; F16J 15/102
See application file for complete search history.

(56) References Cited

U.S. PATENT DOCUMENTS

| | | | | |
|---|---|---|---|---|
| 3,550,990 A | * | 12/1970 | Carlson, Jr. ............ | F16J 15/106 277/566 |
| 6,264,206 B1 | * | 7/2001 | Hashizawa ............ | F16J 15/061 277/641 |
| 2010/0084824 A1 | | 4/2010 | Horiba et al. | |
| 2011/0291364 A1 | | 12/2011 | Otsuka et al. | |
| 2015/0129791 A1 | | 5/2015 | Okita et al. | |
| 2018/0328491 A1 | | 11/2018 | Taylor | |

FOREIGN PATENT DOCUMENTS

| | | |
|---|---|---|
| DE | 10 2015 215 933 A1 | 2/2017 |
| EP | 2 060 834 A1 | 5/2009 |
| JP | 2007-232014 A | 9/2007 |
| JP | 2007-255671 A | 10/2007 |
| JP | 2015-94409 A | 5/2015 |

OTHER PUBLICATIONS

Extended European Search Report dated Oct. 30, 2020 in European Patent Application No. 20182787.0, 7 pages.
Office Action dated Nov. 24, 2021, in Japanese Patent Application No. 2019-125692 w/English-language Translation.

* cited by examiner

*Primary Examiner* — Michael R Reid
(74) *Attorney, Agent, or Firm* — Oblon, McClelland, Maier & Neustadt, L.L.P.

(57) ABSTRACT

In a fluorine resin molded body employed in a fluid device and including a ring-shaped seal section, the seal section is configured from a projection and a backup section that are aligned in a direction in which the seal section receives a compressive load when the fluorine resin molded body is installed in the fluid device.

3 Claims, 11 Drawing Sheets

FLUORINE RESIN MOLDED BODY

CROSS-REFERENCE TO RELATED APPLICATION

This application is based upon and claims the benefit of priority from Japanese Patent Application No. 2019-125692 filed on Jul. 5, 2019, the contents of which are incorporated herein by reference.

BACKGROUND OF THE INVENTION

Field of the Invention

The present invention relates to a fluorine resin molded body including a seal section.

Description of the Related Art

In a valve device or the like employed in semiconductor manufacturing, a corrosive fluid such as ultrapure water or ozonated water is used, hence, from a viewpoint of corrosion resistance, a seal section is sometimes configured from a fluorine resin.

For example, Japanese Laid-Open Patent Publication No. 2015-094409 describes a valve device whose diaphragm is configured by a fluorine resin. An outer edge section of this diaphragm is sandwiched between a retainer configuring part of an actuator section, and a diaphragm holding section provided in a body.

SUMMARY OF THE INVENTION

When a seal section configured from a fluorine resin is applied with a force required for sealing, the seal section undergoes not only elastic deformation but also plastic deformation. Therefore, unlike in the case of a rubber material that does not undergo plastic deformation, it is not easy for good sealing characteristics to be maintained.

The present invention, which was made in order to solve such a problem, has an object of providing a fluorine resin molded body including a seal section by which stable sealing can be performed over a long period.

In a fluorine resin molded body according to the present invention, which is a fluorine resin molded body employed in a fluid device and including a ring-shaped seal section, the seal section is configured from a projection and a backup section that are aligned in a direction in which the seal section receives a compressive load when the fluorine resin molded body is installed in the fluid device.

According to the above-described fluorine resin molded body, the seal section receives the compressive load in a predetermined direction, so the projection undergoes plastic deformation to fill a gap between the projection and a partner member, and the backup section undergoes elastic deformation to secure a sealing pressure due to a reaction force of the elastic deformation, hence stable sealing can be performed over a long period.

The seal section of the fluorine resin molded body according to the present invention is configured from the projection and the backup section that are aligned in the direction in which the seal section receives the compressive load when the fluorine resin molded body is installed in the fluid device, hence exhibits stable sealing characteristics over a long period.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

A fluorine resin molded body of the present invention includes a ring-shaped seal section. Now, although a "fluorine resin molded body including a seal section" includes of course the case where the seal section directly concerned with a sealing function configures part of the fluorine resin molded body, it includes also the case where, substantively, the whole of the fluorine resin molded body is the seal section. A diaphragm valve body whose outer peripheral edge is fixed to a fluid device may be cited as an example of the former, and a so-called seal ring may be cited as an example of the latter.

Preferred embodiments of the seal section of the fluorine resin molded body according to the present invention will be presented and described below with reference to the accompanying drawings.

First Embodiment

A first embodiment of the seal section of the fluorine resin molded body according to the present invention will be described with reference to FIGS. 1-4.

Figure 1:
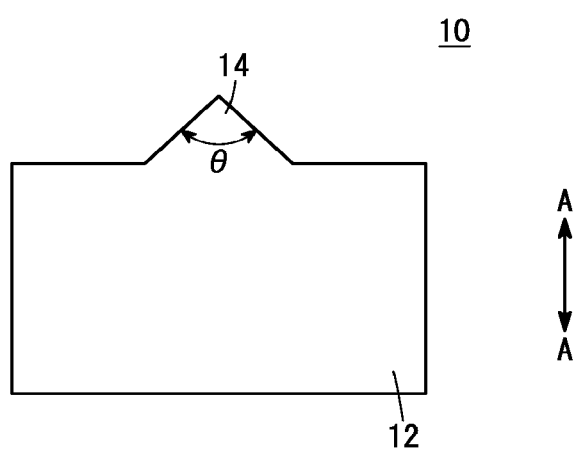
FIG. 1 is a cross-sectional view of a seal section according to a first embodiment of the present invention.

FIG. 1 shows a cross section of a seal section 10 configured in a ring shape. The seal section 10 is configured from a backup section 12 and a projection 14 that projects from the backup section 12. A cross-sectional shape of the backup section 12 is a rectangle, and a cross-sectional shape of the projection 14 is an isosceles triangle having its base placed on one side of the rectangle. Hereafter, for convenience, description will be made assuming the case where the seal section 10 is mounted and fixed in a ring-shaped fitting groove (not illustrated) provided in a fluid device.

The seal section 10, when fixed to the fitting groove, receives a compressive load in a direction in which the backup section 12 and the projection 14 are aligned, that is, an A-A direction. Upon receiving this compressive load, the seal section 10 deforms with elastic deformation and plastic deformation. At this time, a plastic deformation region is concentrated mainly in the projection 14. The backup section 12 undergoes plastic deformation in a region close to the projection 14, and undergoes elastic deformation in part of another region.

Due to the projection 14 undergoing plastic deformation, a gap between the projection 14 and a partner member (not illustrated) is completely filled along a ring-shaped line of a tip of the projection 14. In other words, the tip of the projection 14 deforms so as to fit closely to a surface shape of the partner member. Moreover, since the projection 14 receives an elastic reaction force from the elastically deformed backup section 12, the projection 14 is strongly pressed against the partner member, and there can be secured a sealing action due to a high surface pressure, with the ring-shaped line of the tip of the projection 14 as a sealing line. Note that in an initial state, the tip of the projection 14 may be rounded with 0.5 radius.

In order for required sealing characteristics to be secured, the seal section 10 must have a predetermined recoverability or more when the compressive load on the seal section 10 is released. Moreover, the above-described predetermined recoverability or more is required to be maintained when the compressive load is released, until there elapses at least a period corresponding to a service life from when the compressive load is applied. Note that one seal section 10 of the fluorine resin molded body is fixedly mounted in the fitting groove an initial one time only, and the same seal section 10 is never repeatedly fixedly mounted many times over.

Figure 2:
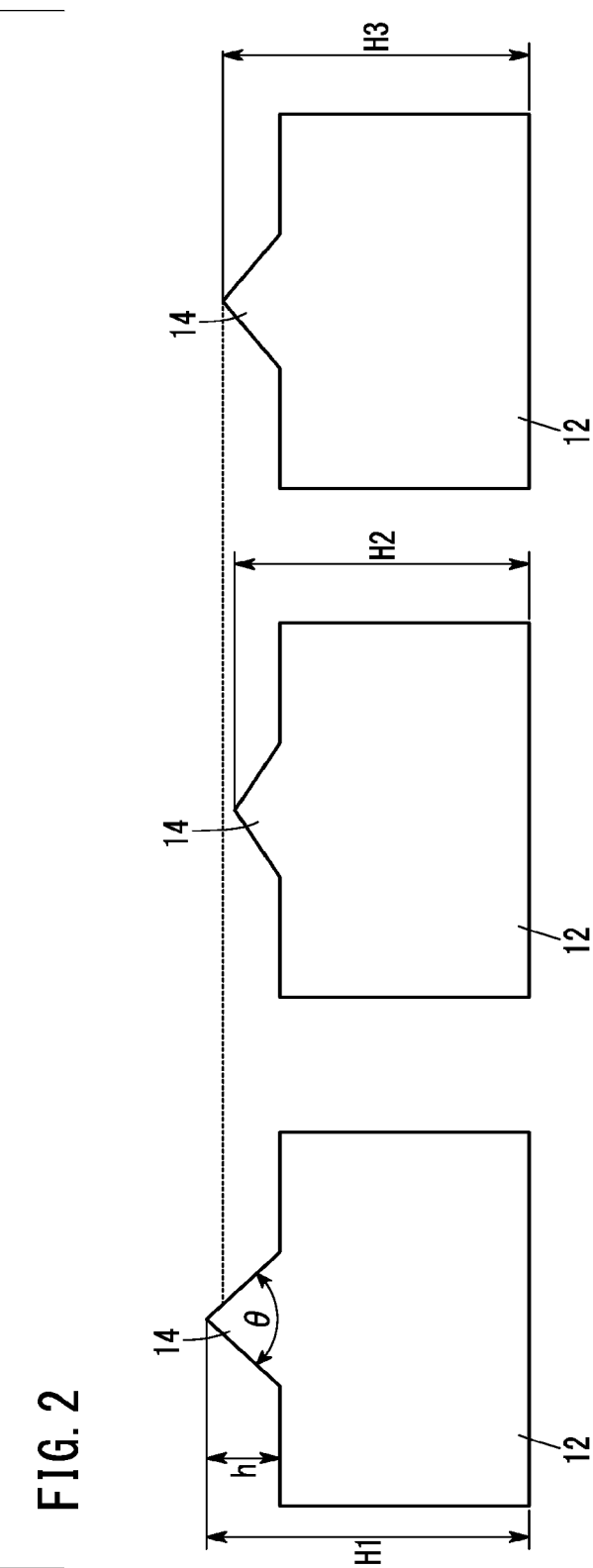
FIG. 2 is a view comparing a height of the seal section of FIG. 1 before and after the seal section is applied with a compressive load and at a time when the compressive load is released.

The applicant investigated how recovery, which is an indicator representing this recoverability, relates to an angle θ of a vertex of the projection 14, and, moreover, how the recovery changes with time. As shown in FIG. 2, "recovery" is a value that is calculated by expression (1) below, assuming a height (a length in the A-A direction) of the seal section 10 before the compressive load is applied to be H1, the height of the seal section 10 after the compressive load has been applied to be H2, and the height of the seal section 10 after the compressive load has been released to be H3. Note that, of course, H3 is larger than H2 and smaller than H1.

$$[\text{Recovery}]=(H1-H2)/(H1-H2) \qquad \text{expression (1)}$$

The fluorine resin molded body employed as a test piece is a ring-shaped fluorine resin molded body, that is, a seal ring, comprising solely the seal section 10 configured from the backup section 12 and the projection 14. In the initial state, the height (H1) of the seal section 10 is 20 mm, and a height h of the projection 14 is 1 mm. Moreover, regarding the angle θ of the vertex of the projection 14 whose cross-sectional shape is an isosceles triangle, three kinds of test pieces having angles θ in the initial state of 60 degrees, 90 degrees, and 120 degrees, were prepared.

Then, the test piece was set in a jig, a compressive load was applied in the A-A direction in which the backup section 12 and the projection 14 are aligned, and compression was performed until the height (H2) of the seal section 10 became 19.5 mm. After being left for a predetermined time (hereafter, called a "leaving time") in this state, the test piece was removed from the jig, and the height (H3) of the seal section 10 when one hour had elapsed after the removal, was measured. A large amount of measurement data was obtained while changing the leaving time in a range up to a maximum of 6900 hours (approximately 290 days), for each of the above-described three kinds of test pieces.

Figure 3:
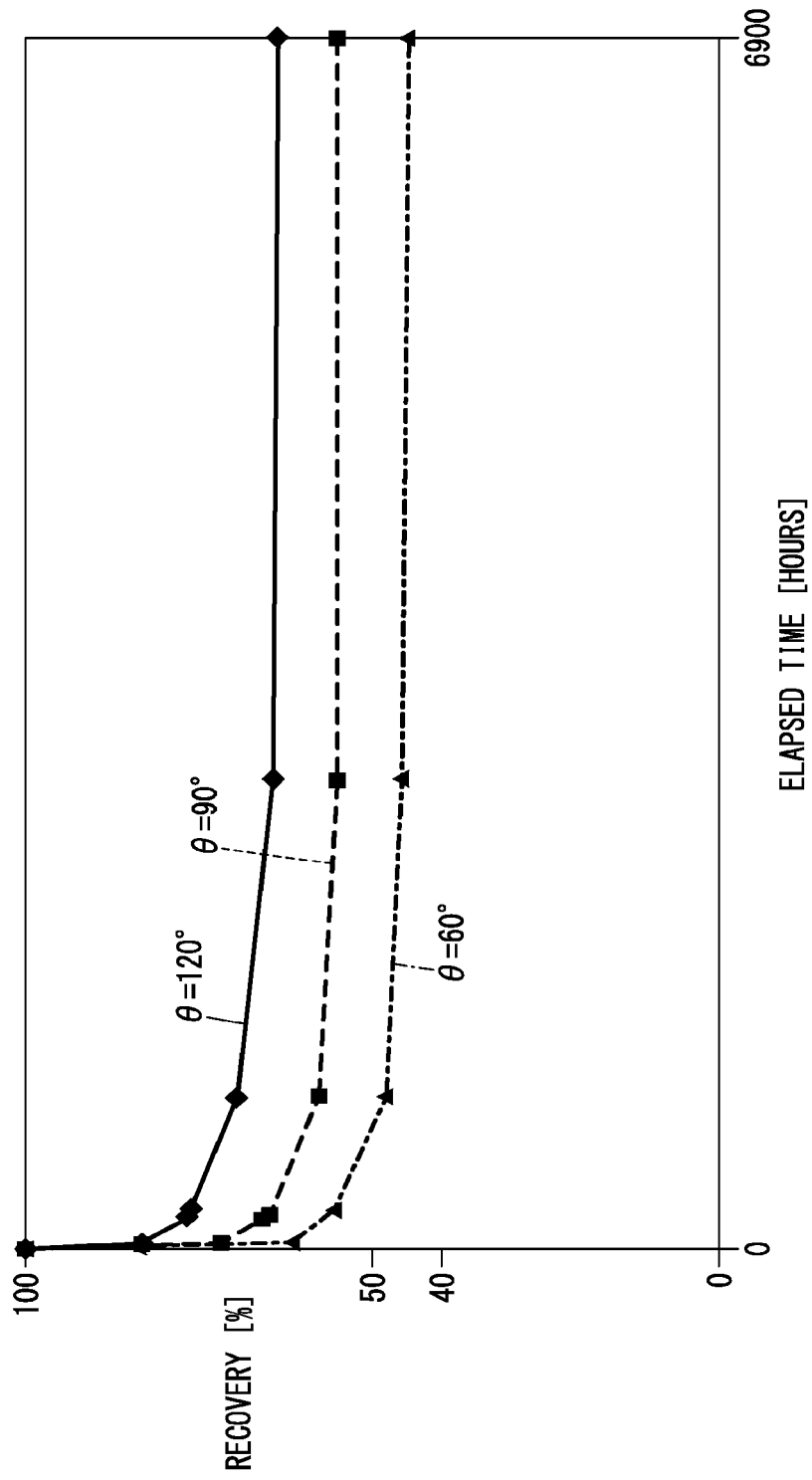
FIG. 3 is a view showing change-with-time of recovery of the seal section of FIG. 1 based on measured data.
Figure 4:
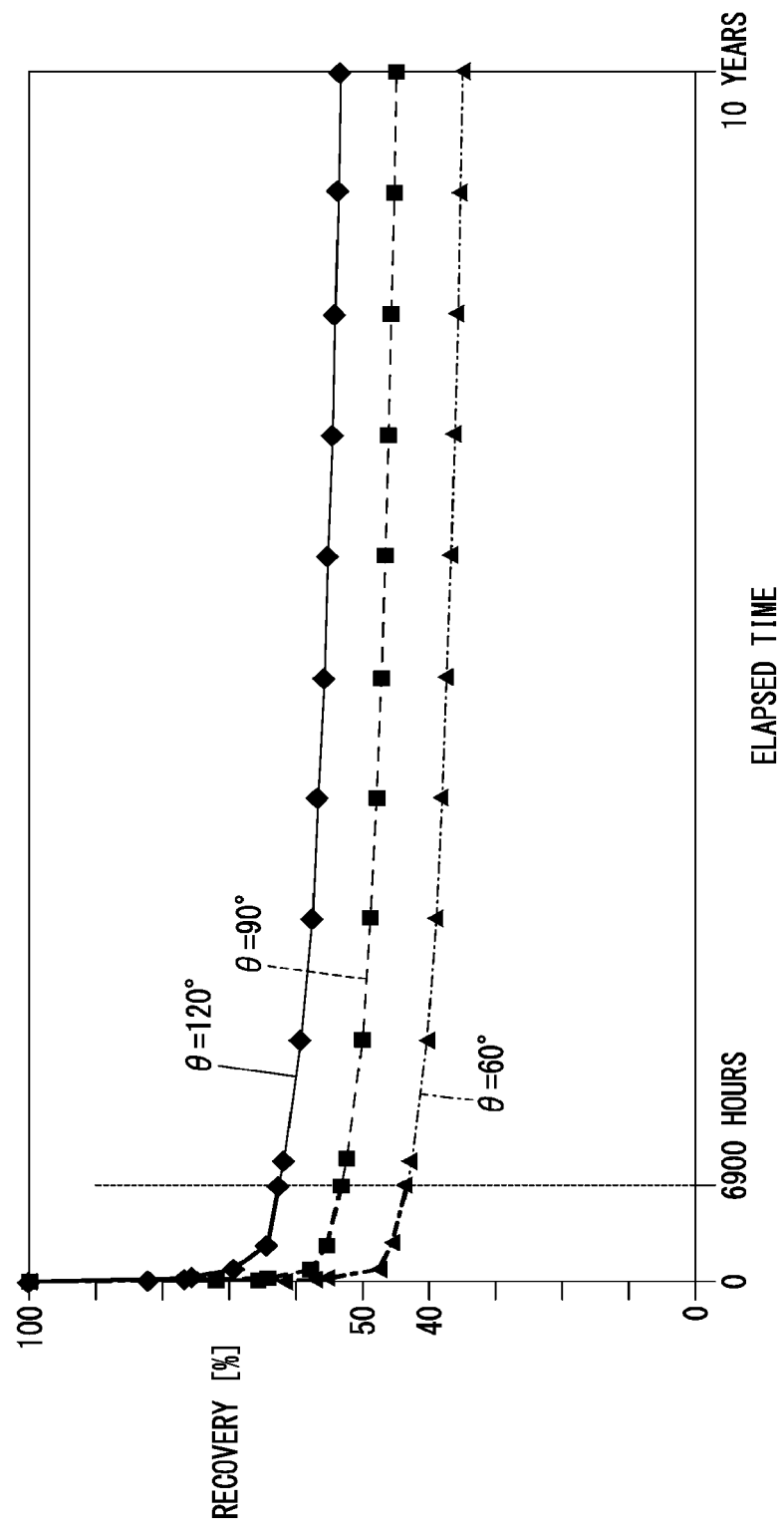
FIG. 4 is a view showing change-with-time of recovery of the seal section of FIG. 1 based on measured data and presumption.

Change-with-time of recovery based on recovery calculated from these measurement data or on presumed recovery, is shown in FIGS. 3 and 4. In these graphs, in which the horizontal axis represents leaving time and the vertical axis represents recovery, the angle θ of the vertex of the projection 14 is set as a parameter. FIG. 3 illustrates curves based on data actually measured for up to the maximum leaving time of 6900 hours, and FIG. 4 illustrates curves each including an outwardly extended portion presumed in the case of the leaving time having been extended to 10 years.

As shown in FIG. 3, the more time elapses, the smaller recovery becomes. A rate at which recovery falls is large at a start of being left, and becomes gradually smaller thereafter. Moreover, as the angle θ of the vertex of the projection 14 becomes smaller (120 degrees→90 degrees→60 degrees), recovery becomes smaller, and the curves showing change-with-time of recovery shift downwardly.

As may be understood from FIG. 4, in the case where service life required of the seal section 10 is assumed to be 10 years, and recovery for exhibiting required sealing characteristics is assumed to be 45% or more, the angle θ of the vertex of the projection 14 should be in a range of 90-120 degrees. If the angle θ of the vertex of the projection 14 exceeds 120 degrees, then a problem occurs in sealing characteristics, and, moreover, according to stress analysis of the projection 14, deformation does not occur in a portion distant from a contact point, hence a waste of material occurs.

Now, a "crushing rate", which is an indicator representing a degree of deformation due to the compressive load, is calculated by expression (2) below employing previously-mentioned H1 and H2.

$$[\text{Crushing Rate}]=(H1-H2)/H1 \qquad \text{expression (2)}$$

(H1−H2) is a so-called crushing margin, and in the above-described test example, the crushing rate is set at 2.5%.

If crushing rate of the seal section is too small, then plastic deformation for fitting the tip of the projection 14 to the surface shape of the partner member and elastic deformation for pressing the tip of the projection 14 against the partner member will not be sufficiently undergone. If crushing rate of the seal section is too large, then internal stress becomes too large so that a rate of plastic deformation occurring rises, and recovery falls. The crushing rate of the seal section is preferably 1-3%.

Second Embodiment

Next, a second embodiment of the seal section of the fluorine resin molded body according to the present invention will be described with reference to FIG. 5. In a seal section 20 of the second embodiment, a shape of a backup section 22 differs from that in the seal section 10 of the first embodiment.

Figure 5:
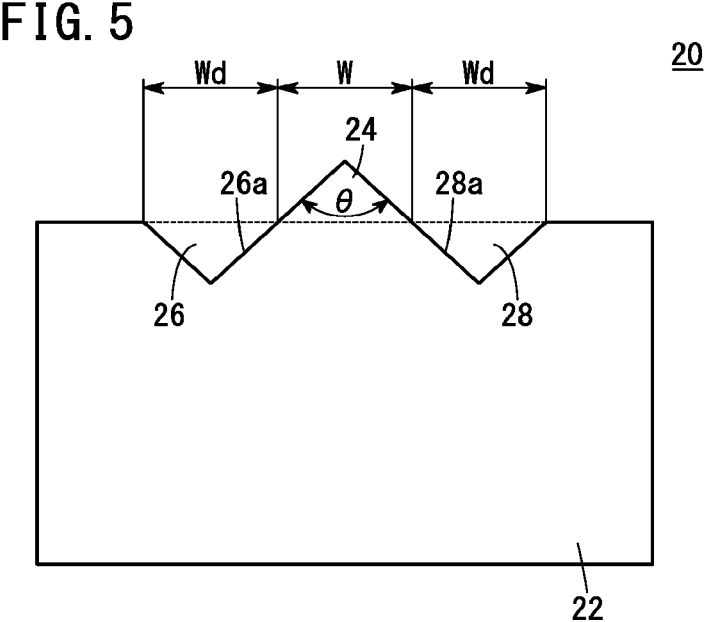
FIG. 5 is a cross-sectional view of a seal section according to a second embodiment of the present invention.

FIG. 5 shows a cross section of the seal section 20 which is configured in a ring shape. The seal section 20 is configured from the backup section 22 and a projection 24 that projects from the backup section 22. A cross-sectional shape of the projection 24 is an isosceles triangle. In the backup section 22, groove sections 26, 28 are formed on both sides of the projection 24 adjacently to the projection 24.

Cross-sectional shapes of the pair of groove sections 26, 28 are isosceles triangles equivalent to the cross-sectional shape of the projection 24, and certain surfaces 26a, 28a of the pair of groove sections 26, 28 extend to be flush with surfaces of the projection 24. Moreover, a width Wd of each of the groove sections 26, 28 is set equal to a width W of the projection 24.

By forming the groove sections 26, 28 on both sides of the projection 24, it becomes easy for the projection 24 to deform not only in a direction in which the compressive load acts, but also in a direction perpendicular to that direction, so deformation of the projection 24 is performed smoothly. Moreover, in the case of the backup section 22 being a flat surface, there will be a portion not contributing to recovery; however, it is possible that, by forming the groove sections 26, 28 on both sides of the projection 24, at least part of the portion not contributing to recovery is removed, and a saving of material is achieved.

Although in the present embodiment, the cross-sectional shapes of the pair of groove sections 26, 28 have been set to isosceles triangles, the cross-sectional shapes may be semicircles, and so on. Moreover, although the width Wd of the pair of groove sections 26, 28 has been set identical to the width W of the projection 24, the width Wd may be selected in a range of 0.5-1.5 times the width W of the projection 24, for example. An angle θ of a vertex of the projection 24 is preferably set to 90-120 degrees, similarly to in the first embodiment.

Third Embodiment

Next, a third embodiment of the seal section of the fluorine resin molded body according to the present invention will be described with reference to FIG. 6. In a seal section 30 of the third embodiment, a shape, and so on, of a backup section 32 differs from those in the seal section 10 of the first embodiment.

Figure 6:
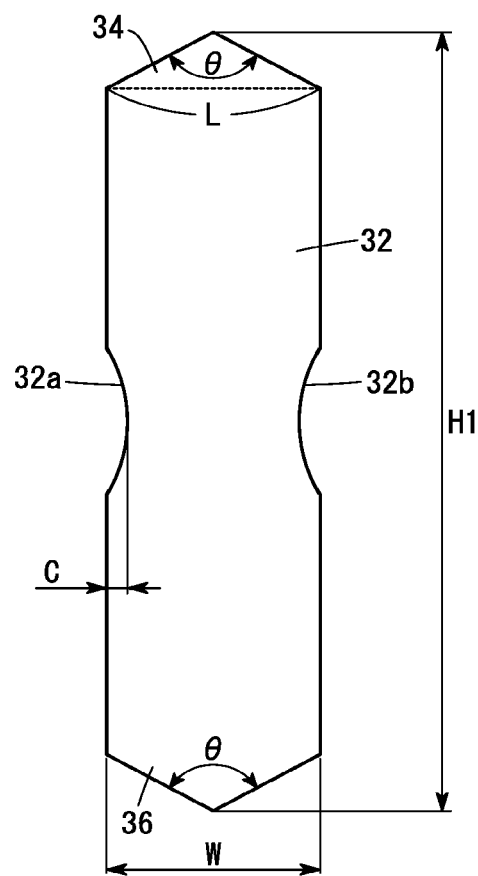
FIG. 6 is a cross-sectional view of a seal section according to a third embodiment of the present invention.

FIG. 6 shows a cross section of the seal section 30 which is configured in a ring shape. The seal section 30 is formed with vertical symmetry, and is configured from a backup section 32 and a pair of projections 34, 36 that project from both upper and lower sides of the backup section 32. The backup section 32, whose cross-sectional shape is a rectangular shape long-and-narrow in an up-down direction, has recesses 32a, 32b formed on both left and right sides thereof. The pair of projections 34, 36, whose cross-sectional shapes are isosceles triangles, have a length L of their bases equal to a width W of the backup section 32.

In order for the backup section 32 to have a shape that allows substantially the whole of the backup section 32 to contribute to elastic deformation, the width W of the backup section 32 is preferably set to 15-25% of a height H1 of the entire seal section 30, in the initial state. As a result, material can be saved to a maximum.

Due to the recesses 32a, 32b being formed on both left and right sides of the backup section 32, a saving of material can be achieved, and, moreover, a self-sealing effect due to a fluid pressure acting on the recesses 32a, 32b can be expected. That is, the fluid pressure acting on the recesses 32a, 32b acts as a force directed to tips of the pair of projections 34, 36, whereby the pair of projections 34, 36 can be even more strongly pressed against the partner member. A recess amount C is preferably set to 5-10% of the width W of the backup section 32. An angle θ of vertices of the projections 34, 36 is preferably set to 90-120 degrees, similarly to in the first embodiment.

Fourth Embodiment

Next, a fourth embodiment of the seal section of the fluorine resin molded body according to the present invention will be described with reference to FIG. 7. A seal section 40 of the fourth embodiment differs from the seal section 10 of the first embodiment in being provided with a plurality of projections.

Figure 7:
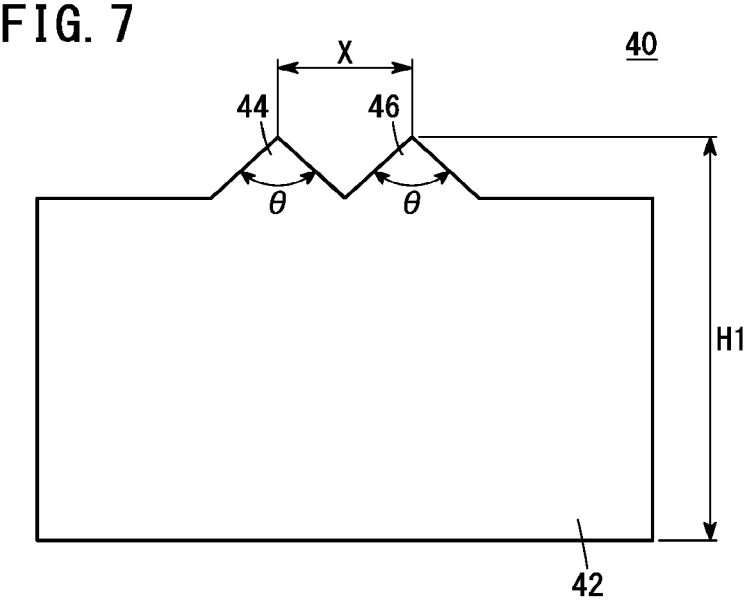
FIG. 7 is a cross-sectional view of a seal section according to a fourth embodiment of the present invention.

FIG. 7 shows a cross section of the seal section 40 which is configured in a ring shape. The seal section 40 is configured from a backup section 42 and two columns of projections 44, 46 that project from the backup section 42. A first projection 44 and a second projection 46, whose cross-sectional shapes are the same isosceles triangles as each other, are disposed aligned so as to contact each other.

In the initial state, an interval X between the first projection 44 and the second projection 46 is preferably set to 15-25% of a height H1 of the seal section 40. Hence, a saving of material can be achieved. Moreover, an angle θ of respective vertices of the first projection 44 and the second projection 46 is preferably set to 90-120 degrees, similarly to in the first embodiment.

Figure 8:
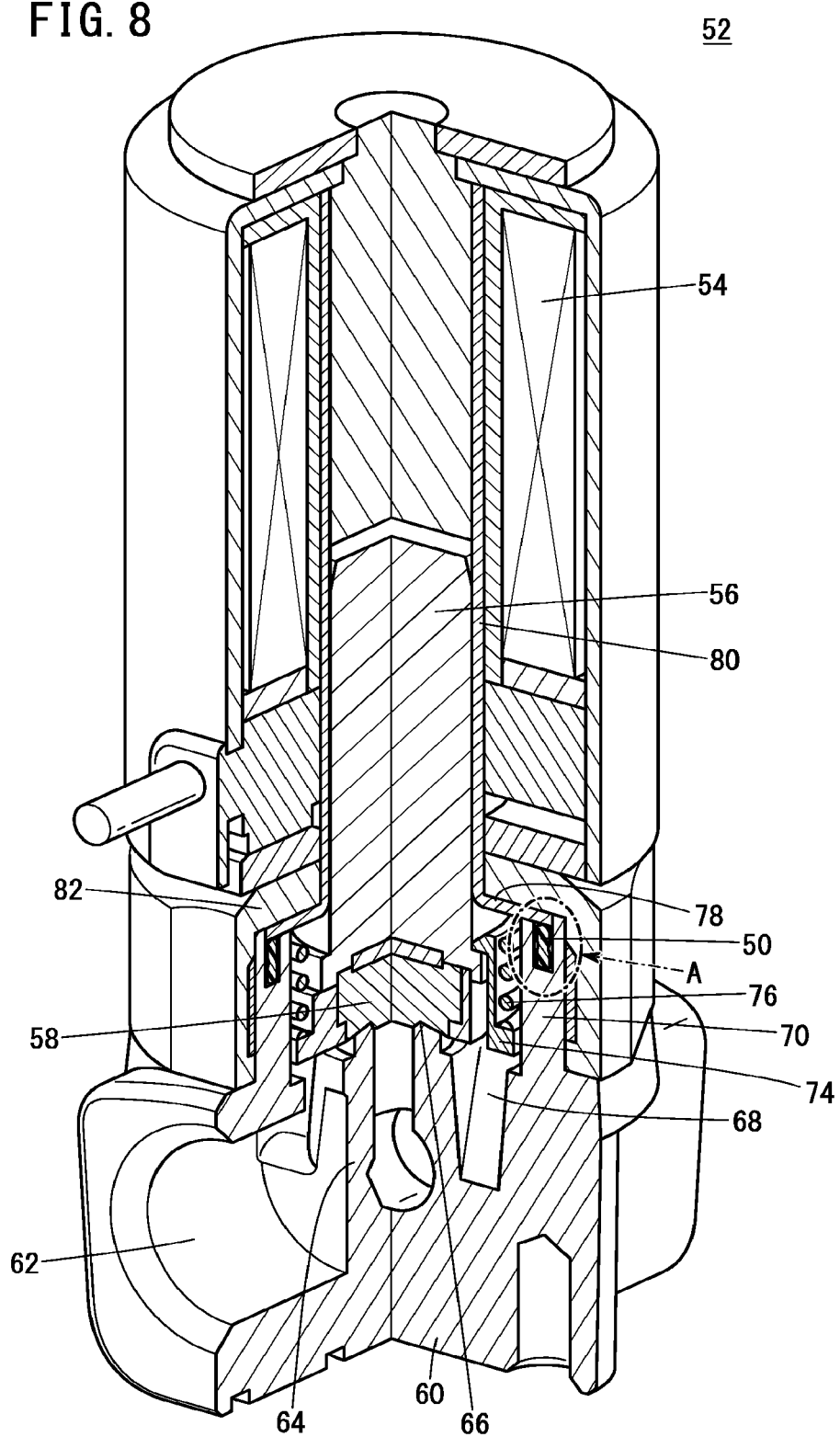
FIG. 8 is a partial cross-sectional view of a device showing an application example of a fluorine resin molded body including the seal section of FIG. 6.
Figure 9:
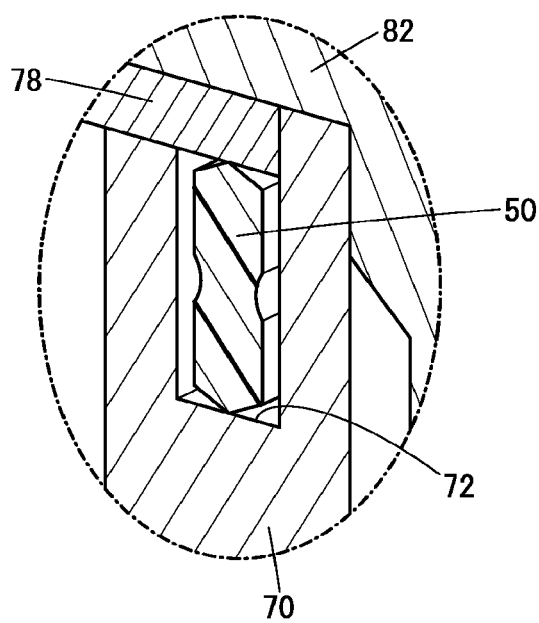
FIG. 9 is an enlarged view of section A of FIG. 8.

FIGS. 8 and 9 show an example in which a seal ring 50 as the fluorine resin molded body including the seal section according to the third embodiment has been applied to an electromagnetically operated two-way valve 52. This two-way valve 52 is one in which a flow path formed on an inside of a valve housing 60 is opened/closed by a valve body 58 integrated with a movable iron core 56 driven by a solenoid coil 54.

On the inside of the valve housing 60 which is made of a metal, a cylindrical partition wall 64 is provided so as to intersect a first port 62. A tip of the partition wall 64 is provided with a valve seat 66 on which the valve body 58 can abut, and in a periphery of the partition wall 64, there is formed a ring-shaped chamber 68 that communicates with the first port 62. The valve housing 60 is provided with a cylindrical projecting wall 70 that extends upwardly from an outer peripheral side of the ring-shaped chamber 68. The seal ring 50 is fixedly mounted in an upwardly opening fitting groove 72 formed in an upper end of the projecting wall 70, and has a function of sealing the ring-shaped chamber 68 from outside.

When the seal ring 50 is fixedly mounted in the fitting groove 72, first, the seal ring 50 is inserted in the fitting groove 72. At this time, the seal ring 50 projects upwardly by a predetermined length from the fitting groove 72. Next, the valve body 58, the movable iron core 56, a coil spring receiver 74, and a coil spring 76 are disposed on an upper section of the partition wall 64 of the valve housing 60, after which a sleeve 80 made of a metal and including a flange section 78 is fitted to an outer periphery of the movable iron core 56, and, furthermore, a cover body 82 is fitted to an outer periphery of the projecting wall 70 of the valve housing 60.

Then, when the cover body 82 is fixed to the valve housing 60 by an unillustrated unit such as a bolt, the seal ring 50 is pressed downwardly by the flange section 78 of the sleeve 80 to be compressed and fixed within the fitting groove 72. At this time, the seal ring 50 is compressed so that the crushing rate is 1-3%. The previously-mentioned predetermined length of projection when the seal ring 50 is inserted in the fitting groove 72 is configured to be such a length that the crushing rate is 1-3%.

Figure 10:
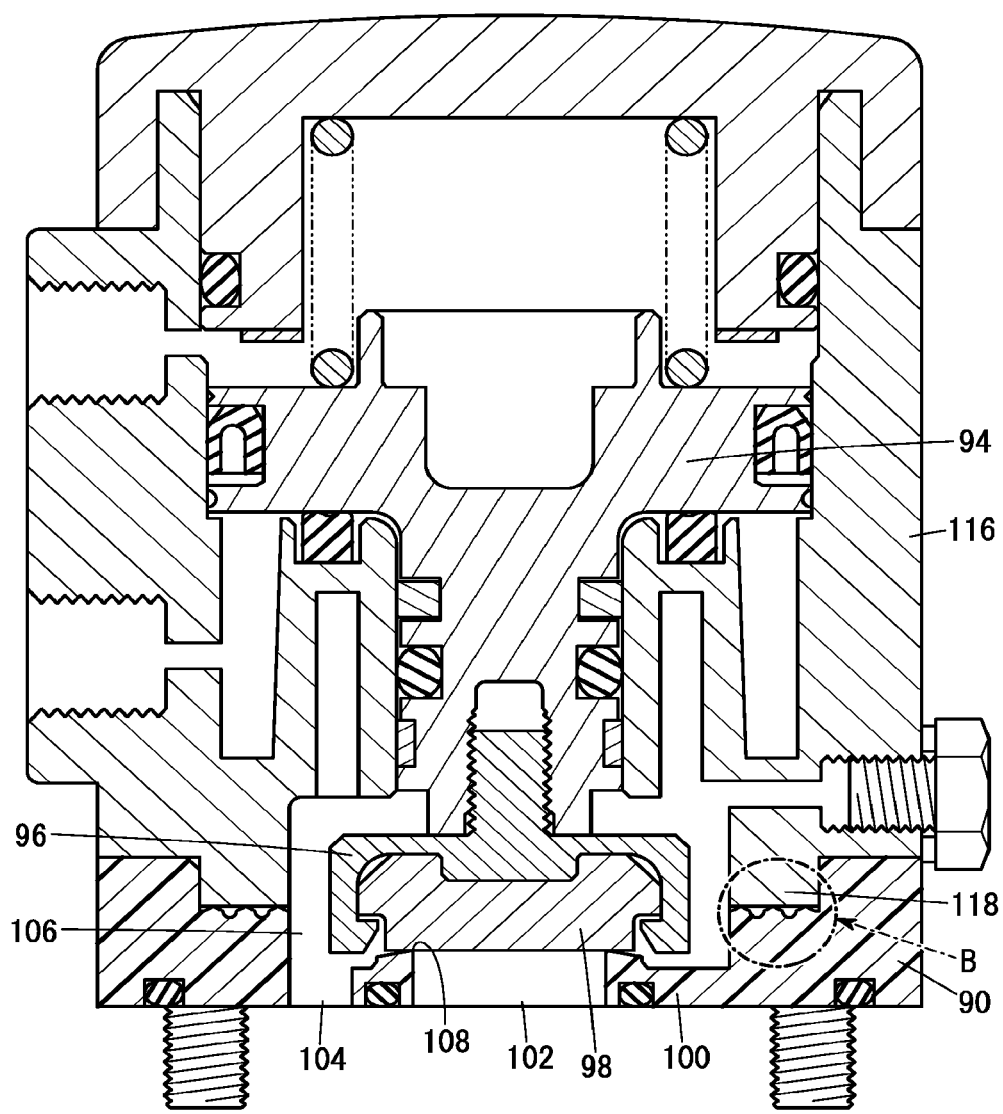
FIG. 10 is a partial cross-sectional view of a device showing an application example of a fluorine resin molded body including a seal section of a form combining those of FIGS. 5 and 7.
Figure 11:
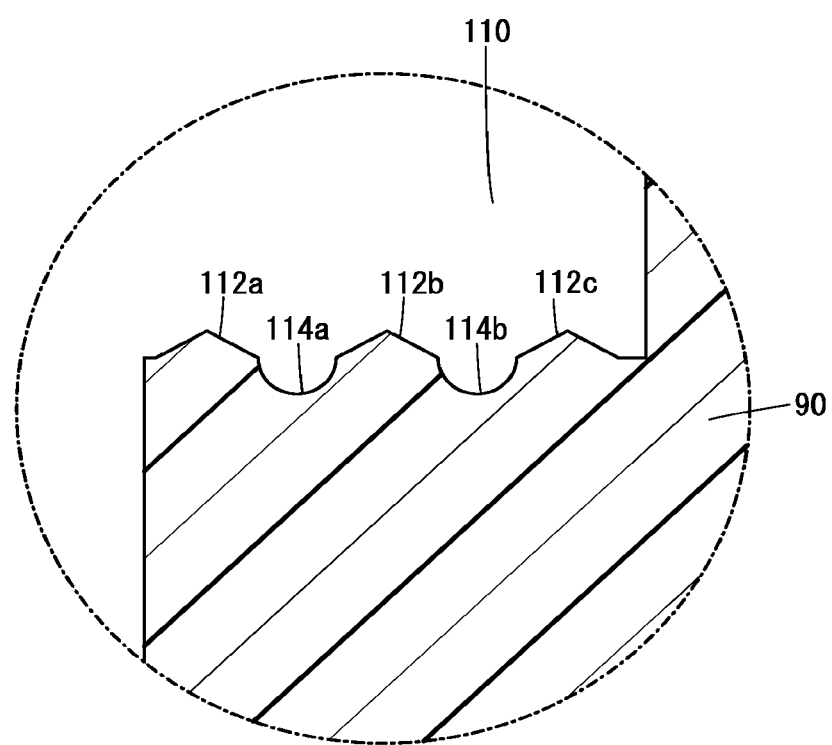
FIG. 11 is an enlarged view of section B of FIG. 10.

FIGS. 10 and 11 show an example in which a valve housing (a first body 90) as a fluorine resin molded body including a seal section of a form combining the seal section of the second embodiment and the seal section of the fourth embodiment, has been applied to an air-operated valve device 92. Note that although FIG. 11 is an enlarged view of section B of FIG. 10, for convenience, only the first body 90 is shown. This valve device 92 is one in which a flow path formed on an inside of the first body 90 is opened/closed by a valve body 98 coupled via a retainer 96 to a piston 94 driven by air pressure.

A bottom section wall 100 of the first body 90 formed in a cylindrical shape is provided with: a first port 102 positioned at a center; and a second port 104 positioned on an outer side of the first port 102. An inner space 106 by which the first port 102 and the second port 104 communicate with each other is formed on the inside of the first body 90. A valve seat 108 on which the valve body 98 can abut is formed on a peripheral edge section of the first port 102 facing the inner space 106.

An upper surface of the first body 90 has a ring-shaped recess 110 formed therein, and a bottom surface of the recess 110 is provided with three columns of ring-shaped projections 112a, 112b, 112c whose cross-sectional shapes are isosceles triangles. A ring-shaped first groove section 114a whose cross-sectional shape is a semicircle is provided between the first projection 112a and the second projection 112b, and a ring-shaped second groove section 114b whose cross-sectional shape is a semicircle is provided between the second projection 112b and the third projection 112c. In the first body 90, a portion positioned on the lower side of the recess 110 configures a backup section.

A second body 116 disposed above the first body 90 is configured from a resin or the like of a material harder than the first body 90. A piston 94 is provided in a slidable manner on an inside of the second body 116, and a ring-shaped projection 118 that fits into the recess 110 of the first body 90 is provided in a bottom section of the second body 116. The second body 116 is fixed to the first body 90 using an unillustrated unit such as a bolt.

When the second body 116 is fixed to the first body 90, the three columns of projections 112a, 112b, 112c are pressed downwardly by a lower surface of the projection 118 of the second body 116. As a result, the three columns of projections 112a, 112b, 112c and the backup section deform, and the inner space 106 of the first body 90 is sealed from outside.

The fluorine resin molded body according to the present invention is not limited to each of the above-mentioned embodiments, and may of course adopt a variety of forms in a range not departing from the spirit of the present invention.

What is claimed is:

1. A fluorine resin molded body employed in a fluid device and comprising:
   a backup section having upper and lower opposing sides in a direction receiving a compressive load when the fluorine resin molded body is installed in the fluid device, the backup section also having right and left opposing sides in a direction perpendicular to the direction receiving a compressive load, the backup section not receiving a compressive load in the direction perpendicular to the direction receiving a compressive load when the fluorine resin molded body is installed in the fluid device;
   ring-shaped seal sections respectively aligned with said upper and lower opposing sides, each said ring shaped seal section being configured from a projection aligned with the respective one of the upper and lower opposing sides of the backup section such that the respective ring-shaped seal sections receive the compressive load when the fluorine resin molded body is installed in the fluid device; and
   recesses able to conduct a flow of the fluid employed in the fluid device being provided at each of said right and left opposing sides,
   wherein a cross-sectional shape of each of the projections is an isosceles triangle comprised of legs of the isosceles triangle respectively joined to the right and left opposing sides, the legs of the isosceles triangle meeting at a vertex having an internal angle of 90-120 degrees.

2. The fluorine resin molded body according to claim 1, wherein a width of the backup section is 15-25% of a height of the seal section.

3. The fluorine resin molded body according to claim 1, wherein a crushing rate of the seal section when the fluorine resin molded body is installed in the fluid device is 1-3%.

* * * * *